Jan. 30, 1968   E. A. FERRIS ET AL   3,366,097
FAN DRIVE UNIT
Filed July 25, 1966   2 Sheets-Sheet 1
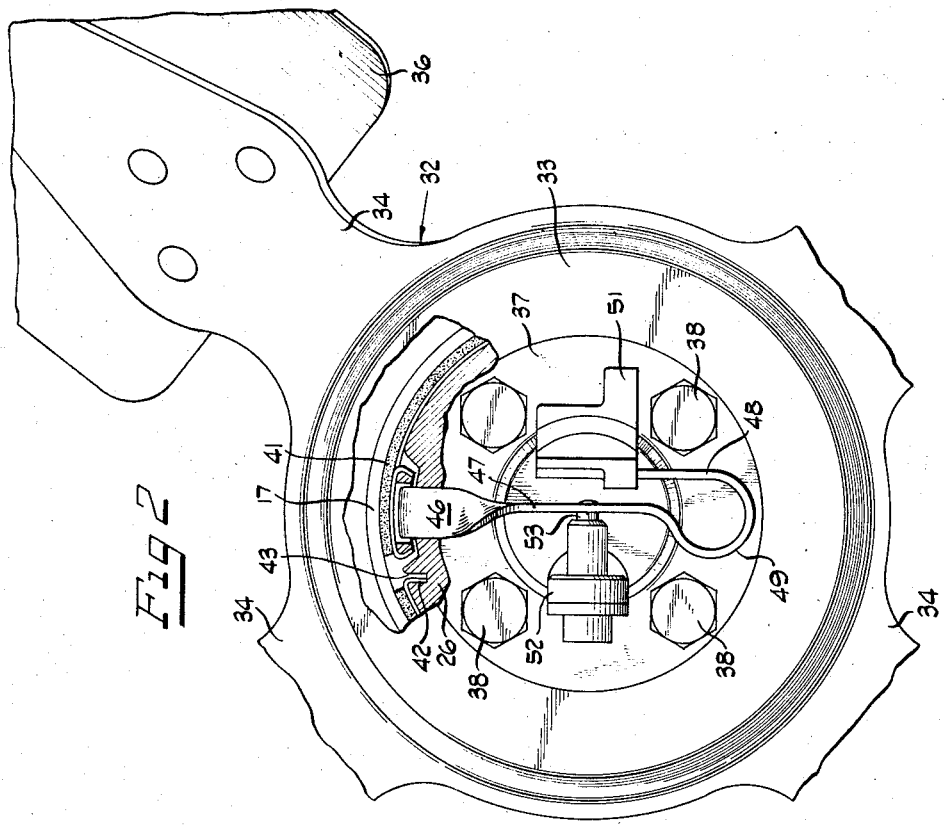
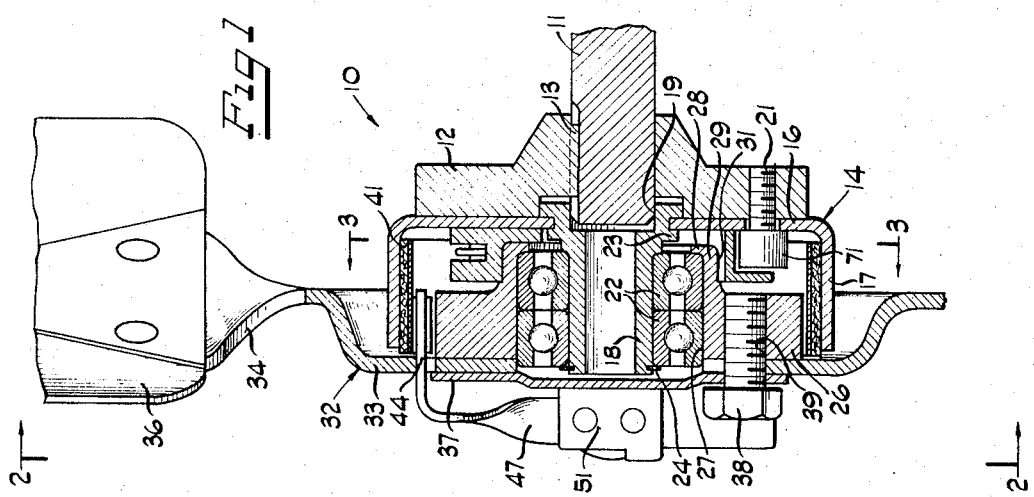
INVENTORS
ERNEST A. FERRIS
JOHN W. McCOLL
BY Herman E. Smith
ATTORNEY Jan. 30, 1968     E. A. FERRIS ET AL     3,366,097
FAN DRIVE UNIT
Filed July 25, 1966     2 Sheets-Sheet 2

INVENTORS
ERNEST A. FERRIS
JOHN W. McCOLL
BY Herman E. Smith
ATTORNEY

United States Patent Office 3,366,097
Patented Jan. 30, 1968

3,366,097
FAN DRIVE UNIT
Ernest A. Ferris, Elmhurst, and John W. McColl, Broadview, Ill., assignors to Borg-Warner Corporation, a corporation of Illinois
Filed July 25, 1966, Ser. No. 567,544
4 Claims. (Cl. 123—41.12)

The present invention relates generally to a fan drive unit, and more particularly to such an automatic unit operable in response to either speed of rotation or ambient temperature.

The apparatus of the present invention is particularly suited for driving the cooling fan of either air cooled or water cooled engines for automobile vehicles.

It has long been known that direct drive coupling of the cooling fan of an automobile vehicle engine is unnecessary and in fact often undesirable at higher speeds. Accordingly, devices have been made available for automatically coupling and uncoupling the cooling fan responsive to the temperature of the air stream circulated about portions of the engine.

Among the features influencing the air stream, in addition to fan rotation, are wind direction and the speed and direction of the vehicle with respect to the wind. It has been found that a vehicle equipped with a thermal sensing element may overheat under certain combinations of wind direction and vehicle movement, or lack of movement, where the combination results in a static air condition surrounding the thermal sensing element.

Accordingly, it is an object of the present invention to provide a fan drive unit incorporating a pair of independently operable automatic drive couplings, one of the said drive couplings being operable responsive to the temperature of the air stream circulated by said fan, and the other of said drive couplings being operable responsive to certain preselected engine speeds for circulating the stream of air about the thermal element.

Other objects and advantages will become apparent from the following description, together with the drawings.

In the drawings:

FIGURE 1 is a section view of the drive unit according to the present invention;

FIGURE 2 is a view taken along the line 2—2 of FIGURE 1, with portions broken away to reveal the mechanism for automatic thermal operation;

Figure 3:
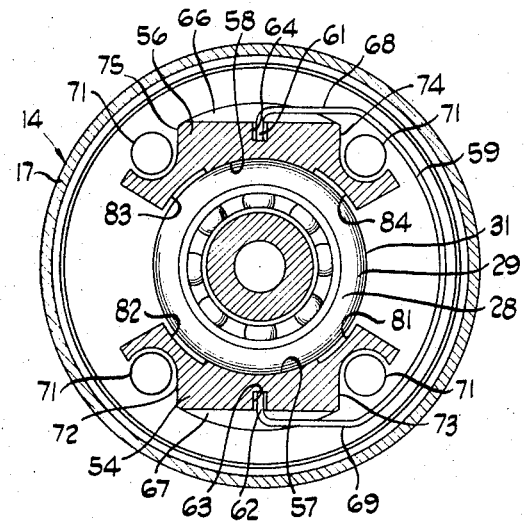
FIGURE 3 is a section view taken along the line 3—3 of FIGURE 1 showing the mechanism for automatic speed responsive operation.

Referring now in more detail to the drawings, and more particularly FIGURE 1 thereof, a drive unit assembly according to the present invention is indicated by the reference character 10. An input shaft 11 extends from portions of a rotary prime mover such as an automobile engine (not shown in the drawings) and is connected to a collar 12 as by splines or a key 13, to form a rotary driving device for the drive unit 10.

A drum member 14 includes a radially extending web portion 16 and a co-axial annular rim portion 17. A shaft extension 18 is secured to web portion 16 and includes a concentric counterbore 19 adapted to fit over the end of input shaft 11. The subassembly of drum 14 and shaft extension 18 is connected to collar 12 by means of cap screws 21, counterbore 19 serving to position the subassembly for concentric rotation about the axis of input shaft 11.

Anti-friction bearings 22, 22 are mounted on shaft extension 18 and secured in axial position between a shoulder 23 and a retaining ring 24. A mounting spider 26 includes a bore 27 and shoulder 28 providing for assembly with bearings 22 such that the spider is free to rotate about the axis of input shaft 11. A hub portion 29 extends axially from one side of spider 26 and includes a race surface 31 extending about the periphery thereof. The other side of spider 26 provides means for mounting a fan 32 including a mounting disc 33, arms 34, and blades 36. A cover plate 37 and mounting disc 33 are provided with matching patterns of bolt holes for receiving cap screws 38. The fan assembly 32 and cover plate 37 are secured to mounting spider 26 by means of cap screws 38 and threaded holes 39.

A flexible friction band 41 is located concentric with the axis of rotation in an annular space between mounting spider 26 and rim portion 17 of drum member 14. One end of friction band 41 is provided with an inturned hook portion 42 adapted to engage a slot 43 in the periphery of mounting spider 26, thus securing band 41 and spider 26 together for rotation. The other end of friction band 41 is connected to a finger 44 extending axially from leg 47 of spring lever 46. Spring lever 46 includes a pair of leg portions 47 and 48 connected to each other by a resilient bight portion 49. Leg portion 48 is secured to cover plate 37 by means of mounting bracket 51. A thermal sensing element 52 is also mounted on cover plate 37 and includes a movable plunger 53 which is connected to leg portion 47 of spring lever 46. Resilient bight portion 49 of spring lever 46 is normally effective to bias leg portion 47 in the counterclockwise direction, as viewed in FIGURE 2, to thereby hold friction band 41 out of frictional engagement with rim portion 17. When the temperature of the air surrounding the apparatus increases to a preselected value sufficient to activate the thermal sensing element 52, plunger 53 moves leg portion 47 in the clockwise direction, thereby engaging an end portion of the friction band 41 with the rim portion 17 of drum member 14. The engine would normally be in operation when sufficient heat is present to activate thermal sensing element 52, thereby resulting in rotation of drum 14. When drum 14 is rotating, initial contact between friction band 41 and rim portion 17 results in self-energizing clutching engagement wherein drum 14 is effective to drive spider 26 and fan 32 by means of friction band 41. When fan 32 is thus driven, blades 36 are effective to circulate a stream of air about portions of the engine and thermal sensing element 52. When the temperature of the air stream drops to a predetermined value, plunger 53 of thermal element 52 permits leg portion 47 to move in the counterclockwise direction, thereby pulling friction band 41 away from rim 17 to uncouple fan 32 from input shaft 11.

When an automobile vehicle is in motion, its movement usually generates sufficient air currents to reliably actuate thermal sensing element 52 so that fan 32 is coupled to input shaft 11 only when needed to circulate cooling air about the engine. However, in some cases, automobile vehicles may be operated under conditions where they are not moving and may be adjacent other vehicles or structures such that samples of the air stream are not reliably circulated around thermal element 52. The present invention provides an auxiliary parallel clutch device for assuring that a sample of the air stream is present around thermal element 52 at all reasonable engine speeds consistent with a non-moving vehicle. This auxiliary parallel clutch device shown in FIGURE 3 is in the form of an independently operable centrifugal disengaging drive coupling, including a pair of centrifugal shoe members 54, 56. Each shoe member 54, 56 includes a respective frictional gripping surface 57, 58 mating with the race surface 31 of hub 29. A spring clip 59, in the form of a yoke, is provided with inturned end portions 61, 62 for engagement with sockets 63, 64 of shoe members 54, 56. Each socket 63, 64 is disposed approximately symmetrically with respect to one of the friction surfaces 57, 58 and extends radially inwardly from an associated groove 66, 67. Portions 68, 69 of spring clip 59 fit within grooves 66, 67 and serve to axially align the pair of shoe members 54, 56 with respect to each other. Inturned end portions 61, 62 of spring clip 59 bear in sockets 63, 64 to press the friction surfaces 57, 58 of shoe members 54, 56 against the race portion 31 of hub 29.

As shown in the drawings, each cap screw 21 used for mounting drum 14 on collar 12 is of the socket head type, having a cylindrical head 71 which projects like a pin or stud from the web portions 17 of drum 14. Each shoe member 54, 56 is provided with a pair of slots 72, 73 and 74, 75. These slots are larger in aperture than the diameter of cap screw heads 71, and spaced so that a pair of slots span a pair of cap screw heads. The cap screw heads 71 thus serve as drive pins for transmitting rotary motion from drum 14 to the shoe members 54, 56. In addition, these drive pins or cap screw heads serve to loosely retain shoe members 54, 56 with respect to drum 14 limiting the radial travel thereof away from hub 29.

Figure 4:
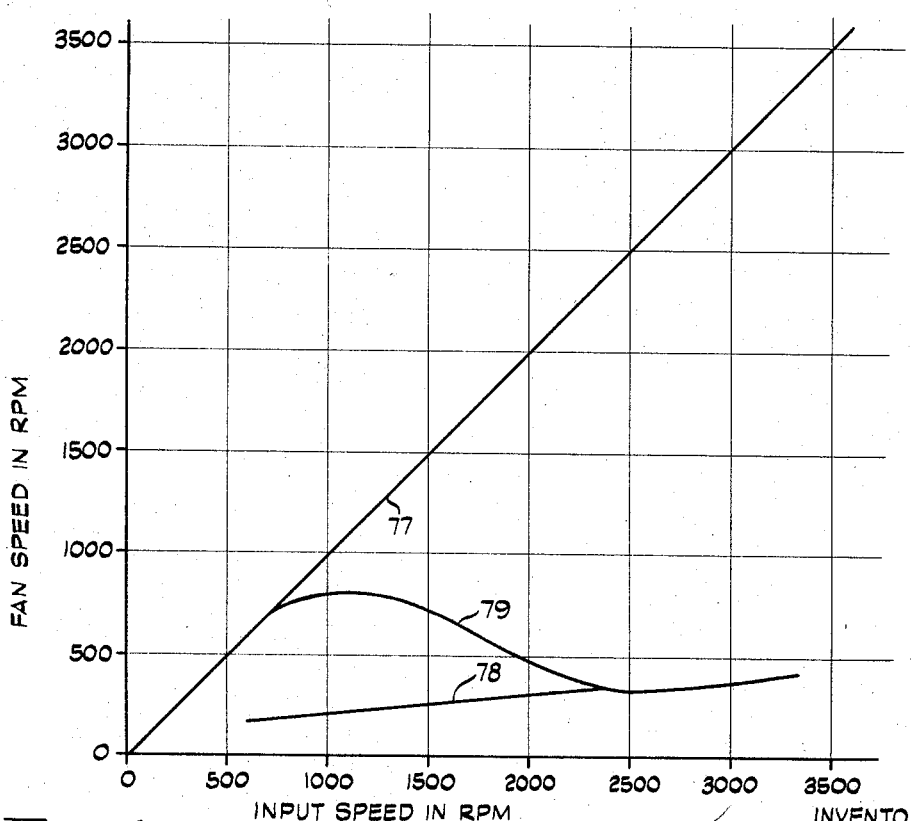
FIGURE 4 is a graph of fan speeds illustrating the operation of the present invention.

The operation of the above described auxiliary drive coupling can be better understood in connection with FIGURE 4, wherein the line 77 represents fan speed as a function of engine speed when the thermally actuated coupling is engaged. The line 78 represents rotation of the fan resulting from the drag of the bearings alone, while the line 79 represents the fan speed resulting from both bearing drag and the auxiliary drive coupling. For convenience of illustration, values will be taken from FIGURE 4 which are representative of a preferred embodiment of the invention for a particular set of operating conditions. These values may be varied to suit other operating conditions. For example, throughout a low speed range of operation, from zero to 750 r.p.m., spring clip 59 is effective to hold shoe members 54, 56 against race 31 of hub 29 so that rotation of drum 14 is transmitted to fan 32. Throughout this low speed range, fan 32 is driven at the speed of input shaft 11.

An intermediate speed range, from about 750 r.p.m. to about 2400 r.p.m., is characterized by a fan speed less than the speed of input shaft 11, as indicated by line 79 of FIGURE 4. This reduction in fan speed is accounted for by the combination of reduced surface area and reduced pressure acting between shoes 54, 56 and the race 31 of hub 29. It should be noted that the friction surfaces 57, 58 of shoe members 54, 56 are relieved at each end as indicated by reference characters 81, 82, 83, 84. These relieved end portions provide clearance for permitting shoe members 54, 56 to rock with respect to race 31, thereby reducing the area of contact between friction surfaces 57, 58 and the race 31. This rocking engagement results from the loose mounting of shoes 54, 56 on the pins 71. Rotation of input shaft 11 and drum 14 tends to move shoe members 54, 56 away from hub 29 by centrifugal action. Throughout the intermediate speed range, the centrifugal forces generated by rotation are of sufficient magnitude to deflect spring clip 59. The location of the inturned end portions 61, 62 of spring clip 59 with respect to pins 71 and slots 72, 73, 74 and 75, result in an unstable condition in which shoe members 54, 56 tend to pivot about one of the pins 71, thereby rocking away from hub 29. Although the fan may be rotating at speeds as low as 300 r.p.m. when the input shaft is turning as high as 2400 r.p.m., this rotation is sufficient to circulate an air stream about thermal element 52, for sampling the temperature of the engine cooling air.

At shaft speeds above 2400 r.p.m., the centrifugal force generated by rotation of shoe members 54, 56 is sufficient to move them outwardly against a pair of pins 71, 71, completely out of contact with hub 29. Speeds above 2400 r.p.m. represent a high speed range in which it is impractical to operate an automobile engine unless the vehicle is in motion. Throughout this high speed range, fan rotation is exclusively under the control of the thermal operated drive coupling, the sample air stream being provided by movement of the vehicle.

Thus, a fan driving system is provided having independently automatically operable thermal engaging and centrifugal disengaging drive couplings arranged and disposed such that the fan is under the exclusive control of the thermal operated drive coupling above a preselected speed and such that below the preselected speed the centrifugal disengaging coupling is effective to circulate a sample air stream for controlling actuation of the thermal operated drive coupling.

Figure 5:
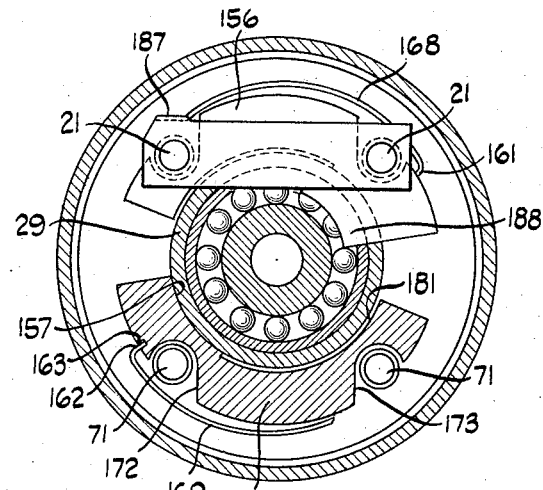
FIGURE 5 is a view similar to FIGURE 3 showing an alternate form of the invention.

Referring now to FIGURE 5, there is shown a modified form of shoe member and spring. This alternate form of shoe is provided with a gripping surface 157, shifted to one end thereof as defined by the relieved portion 181. The slot 173 is located opposite relieved portion 181 and is only slightly larger than cap screw head 71. Slot 173 and cap screw head 71 thus serve as a pivotal joint about which shoe 154 pivots to move gripping surface 157 toward and from hub portion 29. The end of shoe 154 adjacent gripping surface 157 includes a larger slot 172 which serves to permit pivotal motion of shoe 154 while also serving as a stop for limiting outward movement of the shoe at high rotary speeds.

A spring clip 169 has an inturned end portion 162 engaged with a slot 163 for biasing the gripping surface 157 of shoe 154 into engagement with hub portion 29. The means for mounting spring clip 169 can be seen more clearly from an inspection of similar spring clip 168 in the upper portion of FIGURE 5. Spring clip 168 is also provided with an inturned end portion 161 for biasing shoe member 156 toward hub 29. The opposite end 187 of spring clip 168 is integral with bracket 186, the bracket and clip having been formed from a single piece of stock bent to form an angle.

One advantage of this alternate form of construction is that a pair of brackets is secured to web portion 16 of drum 14 beneath the heads 71 of cap screws 21. Each bracket then provides a separate spring clip, such as 168 and 169, for securing a respective one of the centrifugal shoes 156 or 154 in the asesmbly. This arrangement permits member 156 or 154 to be inserted or removed from the assembly without disturbing the other.

Another advantage of the alternate construction resides in a measure of self-energization provided by offsetting gripping surface 157 from the pivotal slot 173. A still further advantage of the alternate construction resides in the provision of additional material, as indicated by 188, adjacent a respective gripping surface, serving as a counterpoise for permitting the predetermination of centrifugal disengaging properties of the shoe members.

While a preferred embodiment of the present invention has been shown and described together with a modified form thereof, it is understood that other modifications and variations are included within the spirit of the invention and scope of the following claims.

We claim:

1. In apparatus for circulating a stream of air about portions of a driving device, the improvement in driving mechanism for selectively connecting a fan to said driving device for rotation therewith comprising; a pair of selectively engageable drive couplings connected independently of each other between said fan and said driving device, each of said drive couplings being operable independently of each other, one of said drive couplings including a centrifugal member, rotatable with said driving device, effective to selectively connect and disconnect said fan and said driving device responsive to the speed of said driving device, the other of said drive couplings including a thermally responsive actuator, rotatable with said fan, effective to selectively connect and disconnect said fan and said driving device responsive to the temperature of the air stream circulated by said fan.

2. The invention according to claim 1 in which said fan includes a hub portion and said driving device includes a radially extending web portion adjacent said hub portion, said one drive coupling including a centrifugal shoe member loosely mounted on said web portion for rotation therewith, said centrifugal shoe member having a gripping surface mating with said hub portion, and spring means biasing said shoe member into gripping engagement with said hub portion for drivingly connecting said fan with said driving device below a preselected rotational speed thereof.

3. The invention according to claim 2 in which said web portion is connected to a rim portion and said other drive coupling includes a frictional clutch member engageable with said rim portion, said thermally responsive actuator being connected to said friction clutch member for movement thereof toward and from engagement with said rim portion responsive to a preselected temperature in said air stream.

4. The invention according to claim 2 in which said web portion includes a pair of spaced pins, and said centrifugal shoe member includes a pair of similarly spaced slots, said slots being larger than said pins for loosely retaining said shoe in circumferential and radial directions with respect to said web portion, said shoe being operable through a first stable low speed range in which said spring means is effective to hold said shoe in gripping engagement with said hub portion for positively driving said fan, a second intermediate speed range in which said spring means is effective to rock said shoe member about one of said pins away from said hub portion for slip driving said fan, said slip driving of said fan being effective to circulate a stream of air about said driving device and said thermally responsive actuator of said other drive coupling for intermittently conditioning said other drive coupling for operation, and a third stable high speed range in which said shoe member is held out of engagement with said hub, thereby disconnecting first drive coupling.

References Cited

UNITED STATES PATENTS

| | | | |
|---|---|---|---|
| 1,782,513 | 11/1930 | Roos | 123—41.11 |
| 2,972,398 | 2/1961 | Davis | 123—41.12 |
| 3,055,474 | 9/1962 | Ferris et al. | 192—82 |
| 3,221,721 | 12/1965 | Kuse | 123—41.12 |

LAURENCE E. EFNER, *Primary Examiner.*